US010885851B2

(12) United States Patent
Qian et al.

(10) Patent No.: US 10,885,851 B2
(45) Date of Patent: Jan. 5, 2021

(54) AMOLED DISPLAY PANEL AND IMAGE DISPLAY DEVICE

(71) Applicant: SeeYA Optronics Co., Ltd., Shangjao (CN)

(72) Inventors: Dong Qian, Shanghai (CN); Tieer Gu, Shanghai (CN); Tong Wu, Shanghai (CN); Qi Li, Shanghai (CN)

(73) Assignee: SeeYA Optronics Co., Ltd., Shanghai (CN)

( * ) Notice: Subject to any disclaimer, the term of this patent is extended or adjusted under 35 U.S.C. 154(b) by 0 days.

(21) Appl. No.: 16/729,878

(22) Filed: Dec. 30, 2019

(65) Prior Publication Data

US 2020/0135116 A1 Apr. 30, 2020

Related U.S. Application Data

(63) Continuation of application No. PCT/CN2018/084749, filed on Apr. 27, 2018.

(30) Foreign Application Priority Data

Nov. 20, 2017 (CN) .......................... 2017 1 1161540

(51) Int. Cl.
*G09G 3/32* (2016.01)
*G09G 3/3258* (2016.01)
(Continued)

(52) U.S. Cl.
CPC ......... *G09G 3/3258* (2013.01); *G09G 3/3266* (2013.01); *G09G 3/3275* (2013.01); *G09G 2300/0828* (2013.01); *G09G 2310/08* (2013.01)

(58) Field of Classification Search
CPC ... G09G 2300/0408; G09G 2300/0828; G09G 2310/0259; G09G 2310/027;
(Continued)

(56) References Cited

U.S. PATENT DOCUMENTS

2005/0030254 A1* 2/2005 Jung ..................... G06F 3/1431
345/1.1
2009/0290680 A1* 11/2009 Tumer ..................... G01T 1/247
378/62
(Continued)

FOREIGN PATENT DOCUMENTS

CN 103489403 A 1/2014
CN 105469735 A 4/2016
(Continued)

*Primary Examiner* — Tony O Davis
(74) *Attorney, Agent, or Firm* — Carlson, Gaskey & Olds

(57) ABSTRACT

An AMOLED display panel includes a pixel display array including a plurality of pixel circuits arranged in an array. A gate driving circuit is adapted to provide a gate scan signal to the pixel circuits. The gate scan signal is used to control an operation stage of the pixel circuits. A source driving circuit is provided with a digital video signal and adapted to generate a data voltage in accordance with the digital video signal. The data voltage is used to control a light-emitting state of a light-emitting element in the plurality of pixel circuits. The pixel display array, the gate driving circuit and the source driving circuit are integrated on the same chip substrate. The source driving circuit is adapted to be coupled to a panel control circuit external to the chip substrate.

10 Claims, 8 Drawing Sheets

(51) Int. Cl.
*G09G 3/3266* (2016.01)
*G09G 3/3275* (2016.01)

(58) Field of Classification Search
CPC ............. G09G 2310/08; G09G 3/3258; G09G 3/3266; G09G 3/3275; G09G 3/3291
USPC ..................................................... 345/99, 690
See application file for complete search history.

(56) References Cited

U.S. PATENT DOCUMENTS

| | | | | |
|---|---|---|---|---|
| 2013/0127805 | A1* | 5/2013 | Chung | G09G 3/3266 345/211 |
| 2013/0201223 | A1* | 8/2013 | Li | G09G 3/3225 345/690 |
| 2014/0306872 | A1* | 10/2014 | Yun | G09G 3/3688 345/99 |
| 2015/0091163 | A1* | 4/2015 | Kim | H01L 24/14 257/737 |
| 2015/0153779 | A1* | 6/2015 | Ko | G06F 1/1652 345/173 |
| 2016/0195969 | A1* | 7/2016 | Kim | G06F 3/0446 345/173 |
| 2017/0164478 | A1* | 6/2017 | Lee | G02F 1/13458 |
| 2017/0309219 | A1* | 10/2017 | Kong | G09G 3/2003 |
| 2018/0083648 | A1* | 3/2018 | Cagdaser | H03M 1/785 |
| 2018/0188882 | A1* | 7/2018 | Kang | G06F 3/044 |
| 2018/0204518 | A1* | 7/2018 | Wang | H01L 27/3265 |
| 2019/0081108 | A1* | 3/2019 | Zhang | H01L 51/5246 |
| 2019/0081109 | A1* | 3/2019 | Zhang | H01L 51/5036 |
| 2019/0114020 | A1* | 4/2019 | Ding | G06F 3/042 |
| 2019/0311678 | A1* | 10/2019 | Lee | G09G 3/3258 |
| 2020/0027421 | A1* | 1/2020 | Sun | G09G 5/028 |
| 2020/0132994 | A1* | 4/2020 | Niu | G02B 27/0172 |
| 2020/0135116 | A1* | 4/2020 | Qian | G09G 3/3291 |
| 2020/0136096 | A1* | 4/2020 | Qian | G03F 7/20 |
| 2020/0160782 | A1* | 5/2020 | Qian | H01L 25/048 |

FOREIGN PATENT DOCUMENTS

| | | | |
|---|---|---|---|
| CN | 105679239 | A | 6/2016 |
| CN | 106097973 | A | 11/2016 |
| CN | 109728028 | A * | 5/2019 |
| KR | 20160092155 | A | 8/2016 |

* cited by examiner

AMOLED DISPLAY PANEL AND IMAGE DISPLAY DEVICE

CROSS-REFERENCE TO RELATED APPLICATIONS

This application is a continuation of International Application No. PCT/CN2018/084749 dated Apr. 27, 2018, which claims priority to Chinese Patent Application No. 201711161540.8, filed on Nov. 20, 2017 and titled "AMOLED DISPLAY PANEL AND IMAGE DISPLAY DEVICE", the content of which is incorporated herein by reference in its entirety.

TECHNICAL FIELD

The present disclosure relates to the field of image display technologies, and in particular, to an AMOLED display panel and an image display device.

BACKGROUND

Compared with a conventional Liquid Crystal Display (LCD), an Organic Light-Emitting Diode (OLED) has a different illumination mechanism and has advantages such as self-illumination, a wide viewing angle, almost infinite contrast, relatively low power consumption and a high reaction speed. The OLED display panel (or a display) includes a pixel display array formed by OLEDs, and the OLEDs are current-driven component compared to the LCD that is driven by a voltage. Therefore, generally, each OLED in the array is provided with a driving circuit, and at least the OLED and the driving circuit can be referred to as a pixel circuit. Specifically, a data voltage can be used to control a magnitude of a driving current generated by the driving circuit, to drive the OLED to emit light. The wider effective value range of the image data voltage leads to the better fineness of the OLED illumination intensity and the higher PPI and resolution of the OLED display. From the perspective of a driving method, the OLED can be divided into an Active Matrix/Organic Light-Emitting Diode (AMOLED) and a Passive Matrix/Organic Light-Emitting Diode (PMOLED). The AMOLED has become a mainstream element in the display panel with its ultra-thin panel, self-illumination and low power consumption.

In the related art, the AMOLED display panel in an OLED on silicon wearable product may include at least a pixel display array, a gate driving circuit (Gate driver On Array, GOA for short), a source driving circuit, and a panel control circuit.

As shown in FIG. 1, respective circuit modules in an AMOLED display panel 1000 of the OLED on silicon product, i.e., a pixel display array 10, a gate driving circuit 20, a source driving circuit 30 and a panel control circuit 40, are all integrated in the AMOLED display panel 1000, resulting in a very high cost for a technology process of the panel.

SUMMARY

The technical problem solved by the present disclosure is how to reduce processing cost of the AMOLED display panel.

In order to solve the above technical problem, an embodiment of the present disclosure provides an AMOLED display panel, and the AMOLED display panel includes: a pixel display array, the pixel display array including a plurality of pixel circuits arranged in an array; a gate driving circuit adapted to provide a gate scan signal to the plurality of pixel circuits, the gate scan signal being used to control an operation stage of the plurality of pixel circuits; and a source driving circuit provided with a digital video signal and adapted to generate a data voltage in accordance with the digital video signal, the data voltage being used to control a light-emitting state of a light-emitting element in the plurality of pixel circuits, wherein the pixel display array, the gate driving circuit and the source driving circuit are integrated on a same chip substrate, and the source driving circuit is adapted to be coupled to a panel control circuit external to the chip substrate.

Optionally, the panel control circuit comprises one or more of a power module, a clock module, or a voltage reference module.

Optionally, the source driving circuit includes: a ramp Digital-to-Analog Converter (DAC) adapted to output a first ramp voltage, the first ramp voltage varying linearly with a preset step over time within a preset voltage range; and a first data strobe circuit provided with i associated digital video signals and adapted to respectively generate a corresponding data strobe signal based on each of the associated digital video signals at a first moment, the first moment being a moment associated with a value of the associated digital video signals, each of the associated digital video signals being associated with a digital video signal, the data strobe signal being used to strobe the first ramp voltage to be directly or indirectly used as a data voltage, and the data voltage being used to control a display state of the plurality of pixel circuits in the display panel, wherein the ramp DAC is of M bits, and a bit number of the respective digital video signal is N, M≤N, where i, M and N are positive integers.

Optionally, M=N, and the first ramp voltage varies in a linearly increasing manner; and the first data strobe circuit includes: a counter; i numerical comparators adapted to respectively compare a counting result of the counter with a value of a corresponding one of the associated digital video signals and generate a corresponding data strobe signal when the two are equal; and i first switches, each of the i first switches having a first terminal provided with the first ramp voltage and a second terminal outputting the data voltage, and each of the i first switches being turned on in response to the data strobe signal.

Optionally, M=N, and the source driving circuit further includes: a data extension module adapted to map the respective digital video signal having a bit number of N to an extended digital video signal having N+P bits according to a preset lookup table, where P is a positive integer; i step adjustment modules adapted to perform an amplitude adjustment on the first ramp voltage to obtain a corresponding second ramp voltage, in such a manner that an amplitude of the second ramp voltage is equal to a value obtained by the first ramp voltage minus the preset step and then plus a product of the preset step and a voltage-division factor, where the voltage-division factor is one of $2^P$ sub-voltage-division factors, the $2^P$ sub-voltage-division factors are in an arithmetic progression with a first term of 0 and a tolerance of $\frac{1}{2}^P$; and a control signal generation module adapted to control a magnitude of the voltage-division factor in each of the i step adjustment modules according to low P bits of the extended digital video signal, wherein the associated digital video signal is high N bits of the extended digital video signal, and the second ramp voltage is used as the data voltage.

Optionally, each of the i step adjustment modules includes a second data strobe circuit and a weighted resistor divider network; wherein, the second data strobe circuit is accessed to the first ramp voltage and adapted to be turned on at a second moment, to transmit the first ramp voltage of the second moment to a second input terminal of the weighted resistor divider network, and the second moment is a moment associated with a value of the high N bits of the extended digital video signal minus 1; and a first input terminal of the weighted resistor divider network is coupled to an output terminal of the first data strobe circuit, so that the first input terminal of the weighted resistor divider network is provided with the first ramp voltage corresponding to the first moment; the weighted resistor divider network is adapted to perform, based on the first ramp voltage at the second moment, voltage-division on the preset step according to the voltage-division factor, to obtain the second ramp voltage.

Optionally, M+P=N, and P is a positive integer; the associated digital video signal is high M bits of the digital video signal; the source driving circuit further includes: i step adjustment modules adapted to perform an amplitude adjustment on the first ramp voltage to obtain a corresponding second ramp voltage, such that an amplitude of the second ramp voltage is equal to a value obtained by the first ramp voltage minus the preset step and then plus a product of the preset step and a voltage-division factor, where the voltage-division factor is one of $2^P$ sub-voltage-division factors, and the $2^P$ sub-voltage-division factors are in an arithmetic progression with a first term of 0 and a tolerance of $1/2^P$; and a control signal generation module adapted to control a magnitude of the voltage-division factor in the respective step adjustment module according to low P bits of the digital video signal, wherein the second ramp voltage is used as the data voltage.

Optionally, each of the i step adjustment modules includes a second data strobe circuit and a weighted resistor divider network; wherein, the second data strobe circuit is provided with the first ramp voltage and is adapted to be turned on at a second moment to transmit the first ramp voltage of the second moment to a second input terminal of the weighted resistor divider network, and the second moment is a moment associated with a value of the high M bits of the digital video signal minus 1; and a first input terminal of the weighted resistor divider network is coupled to an output terminal of the first data strobe circuit, so that the first input terminal of the weighted resistor divider network is provided with the first ramp voltage corresponding to the first moment; and the weighted resistor divider network is adapted to perform, based on the first ramp voltage at the second moment, voltage-division on the preset step according to the voltage-division factor, to obtain the second ramp voltage.

Optionally, the source driving circuit further includes: a numerical value extraction module adapted to extract values of the high M bits and the low P bits of the respective digital video signal.

Optionally, the weighted resistor divider network includes: $2^P$ voltage-division resistors sequentially connected end to end, a first terminal of a first voltage-division resistor being coupled to the output terminal of the first data strobe circuit, and a second terminal of a last voltage-division resistor being coupled to an output terminal of the second data strobe circuit; $2^P$ second switches, a first terminal of a $j^{th}$ second switch being coupled to a second terminal of a $j^{th}$ voltage-division resistor, where $1 \le j \le 2^P$, and a second terminal of a $k^{th}$ second switch being coupled to a second terminal of a $(k+1)^{th}$ second switch, where k is an odd number, and $1 \le k \le 2^P-1$; and $2^{P-1}$ third switches, a first terminal of a $m^{th}$ third switch being coupled to a second terminal of a $(2 \times m-1)^{th}$ second switch, where $1 \le m \le 2^{P-1}$, and second terminals of the $2^{P-1}$ third switches being coupled, to output the second ramp voltage.

In order to solve the technical problem, an embodiment of the present disclosure further provides an image display device, and the image display device includes the AMOLED display panel and a panel control circuit external to the chip substrate described above.

Compared with the related art, the technical solution of the embodiment of the present disclosure has following beneficial effects:

The AMOLED display panel of the embodiment of the present disclosure integrates the pixel display array, the gate driving circuit and the source driving circuit on the same chip substrate, and the source driving circuit is adapted to be coupled to the panel control circuit external to the chip substrate. Since the pixel display array, the gate driving circuit and the source driving circuit include a large number of analog circuits and a small number of digital circuits, the AMOLED display panel can be fabricated using, for example, a process based on a medium voltage. Since the medium voltage process is compatible with a low voltage process, complexity of the technology process can be reduced, and the process cost of the AMOLED display panel can be effectively decreased. In addition, the panel control circuit having high circuit complexity is disposed external to the chip substrate of the AMOLED display panel, and the panel control circuit and the AMOLED display panel are separately fabricated, such that circuit complexity of the AMOLED display panel can be effectively reduced, and a utilization rate and a yield of a wafer can be separately improved, thereby further reducing the cost.

Further, the source driving circuit of the embodiment of the present disclosure may include a ramp DAC and a first data strobe circuit. Since an architecture of the source driving circuit may perform conversion processing on the i digital video signals in parallel, to correspondingly obtain i data voltages, and the number of the ramp DAC may be only one; when the resolution of the AMOLED display panel is increased, the number of the ramp DAC can still be maintained unchanged. Compared with the related art, the solution of this embodiment has a simple structure and can effectively reduce an occupied chip area; in addition, since there is no resistor architecture, unevenness of the data voltages caused by a large amount of resistance value deviations of resistors doesn't exist, so that uniformity of the display panel is good.

Further, M=N, and the source driving circuit may further include a data extension module, i step adjustment modules, and a control signal generation module. By extending the bit number of the digital video signal through the data extension module, the step adjustment module can make, according to the low P bit of the extended digital video signal obtained by extension, a step adjustment on the P bit precision of the first ramp voltage output by the ramp DAC, and cascade of the two together achieves the output of the data voltage having M+P bit precision. Further, first, provision of the data extension module can achieve high conversion precision of the digital video signal VideoSignal based on low precision, which is conducive to improving the display effect of the AMOLED display panel; secondly, since when the M+P bit conversion precision is achieved by simply using the ramp DAC and the conversion precision is relatively large, the one LSB of the ramp DAC may be smaller than an offset voltage of its internal operational amplifier, which it impossible for the ramp DAC to guarantee the M+P-bit precision, while adopting the cascaded architecture of the low-precision ramp DAC and the step adjustment module is more conducive to guarantee the realization of the M+P bit conversion precision; again, as the resolution increases, an output load of the ramp DAC becomes larger, and the higher the precision of the input signal, the slower the response time, while adopting the cascading method can effectively solve the problem that the load of the ramp DAC is too large and the response is too slow in the case of high-precision input signals.

Further, M+P=N, where P is a positive integer; the driving circuit may further include i step adjustment modules and a control signal generation module. The precision of the ramp DAC is M, and the step adjustment module perform a step adjustment on the P bit precision of the first ramp voltage output by the ramp DAC, such that cascade of the two together achieves the output of the data voltage of N bit precision. Further, firstly, adopting a cascade method in the present embodiment can improve the precision of the obtained data voltage Data, to allow input of high-precision digital video signal, preferably, N≥8, which is conducive to achieve high-precision display effect of the AMOLED display panel; further, the present embodiment is also conducive to guarantee the achievement of N bit conversion precision, and it can also effectively solve the problem that the load of the ramp DAC is too large and the response is too slow in the case of high-precision input signals.

DESCRIPTION OF EMBODIMENTS

As described in the part of the Background, an AMOLED display panel in the related art integrates various circuit modules, a pixel display array, a gate driving circuit, a source driving circuit, and a panel control circuit into the AMOLED display panel, resulting in a very high cost for a technology process of the panel.

An inventor of the present disclosure analyzed a structure of the AMOLED display panel in the related art.

Figure 1:
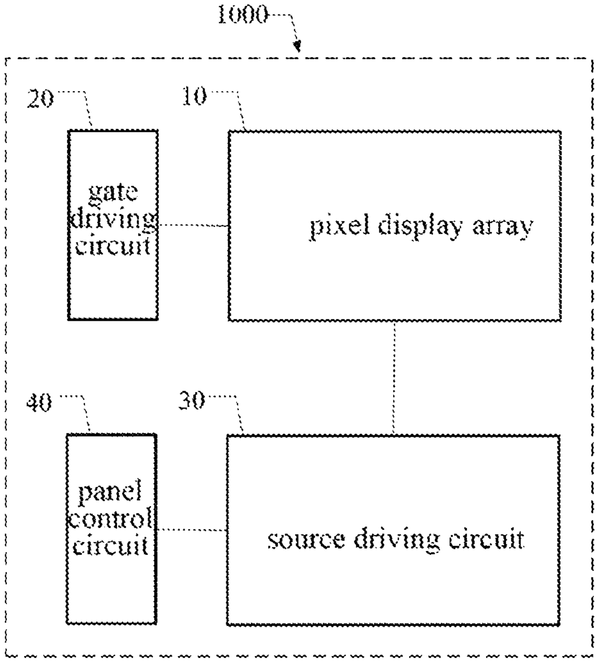
FIG. 1 (Prior Art)
FIG. 1 is a structural schematic block diagram of an AMOLED display panel in the related art.

With continued reference to FIG. 1, the various circuit modules integrated in the AMOLED display panel 1000 include both analog and digital circuit modules. Each of the circuit modules is made of Low Temperature Poly-Silicon (LTPS) Thin Film Transistor (TFT). Because in the technology process of the integrated circuit, components in the analog and digital circuits need to adopt different voltage standards, and a size of the TFT is very small for consideration of a low power consumption, a processing technology of the AMOLED display panel 1000 needs to be very fine and the process is complicated, which greatly increases the process cost.

Figure 2:
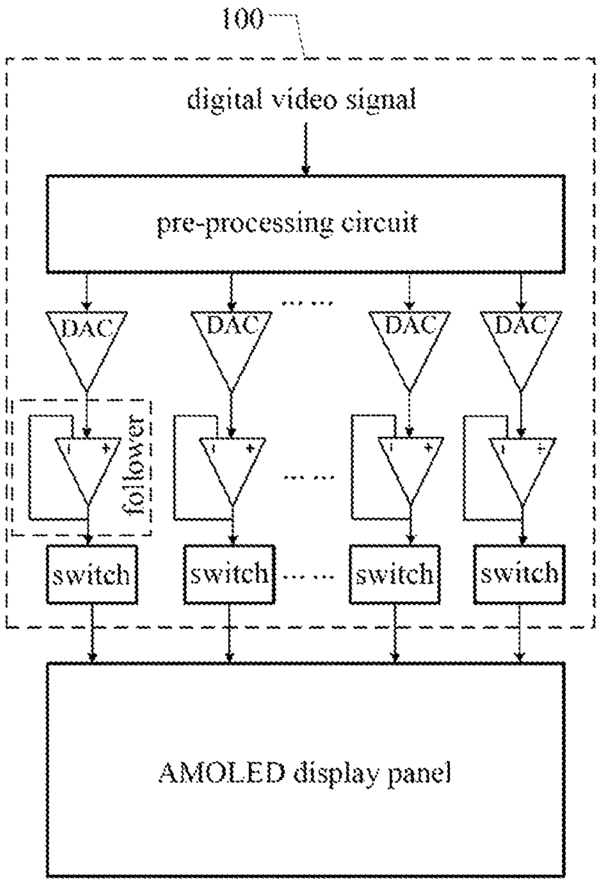
FIG. 2 (Prior Art)
FIG. 2 is a schematic diagram of a circuit structure of a source driving circuit in the related art.

Further, the source driving circuit in the related art also has numerous drawbacks. Referring to FIG. 2, a source driving circuit 100 of an AMOLED display panel in the related art may include a pre-processing circuit, a plurality of Digital-to-Analog Converters (DACs), a plurality of followers, and a plurality of switches. It is assumed that resolution of the AMOLED display panel is 1024×720, that is, it has an array formed of 1024 rows×720 columns of pixel circuits. The source driving circuit 100 performs conversion processing on digital video signals corresponding to all columns of pixel circuits of each row in the array, that is, 720 digital video signals, in parallel. In the source driving circuit 100, the pre-processing circuit is adapted to perform preliminary processing on a plurality of digital video signals and then latch, respectively perform digital-to-analog conversion on the digital video signals via a plurality of DACs, and transmit, under an effect of impedance matching of the followers, respective data voltages obtained by the conversion to one terminal of respective switches. The system can control turn-on of the respective switches with a preset update frequency, to transmit the respective data voltages to the AMOLED display panel. The source driving circuit 100 updates one row in the AMOLED display panel each time, and after completing 1024 updates, the AMOLED display panel acquires and displays one frame of image. In a specific implementation, the above update frequency can reach 60 Hz, and therefore, a human eye cannot recognize the above-mentioned process of updating in rows.

Since the data voltage output by each DAC requires a set of DACs to convert the digital video signal, the number of DACs is 720, which results in a very large area of the source driving circuit 100. The higher the resolution of the AMOLED display panel is, the larger the area occupied by the DAC in the source driving circuit 100 is, thereby reducing a chip integration level. In addition, when the DAC is a conventional DAC in the related art that is of a combination of a resistor and a switch (such as a weighted resistor network DAC), since the area occupied by the resistor is large, the area of the source driving circuit 100 is further increased.

In addition to causing an excessive large circuit area, the source driving circuit 100 further has following drawbacks that when a DAC of a combination of a resistor and a switch is used, due to non-uniformity in the process of manufacturing an integrated circuit (IC), there would be a large amount of resistance value deviations of resistors, whereas the deviations will directly affect consistency of the data voltages, thereby resulting in an uneven display of the display panel.

The present disclosure provides an AMOLED display panel, in which a pixel display array, a gate driving circuit and a source driving circuit are integrated on a same chip substrate, and the source driving circuit is adapted to be coupled to a panel control circuit external to the chip substrate, thereby effectively reducing the process cost of the AMOLED display panel.

The above described objects, features, and beneficial effects of the present disclosure will become more apparent from the detailed description of the specific embodiments of the present disclosure with reference to the accompany drawings.

Figure 3:
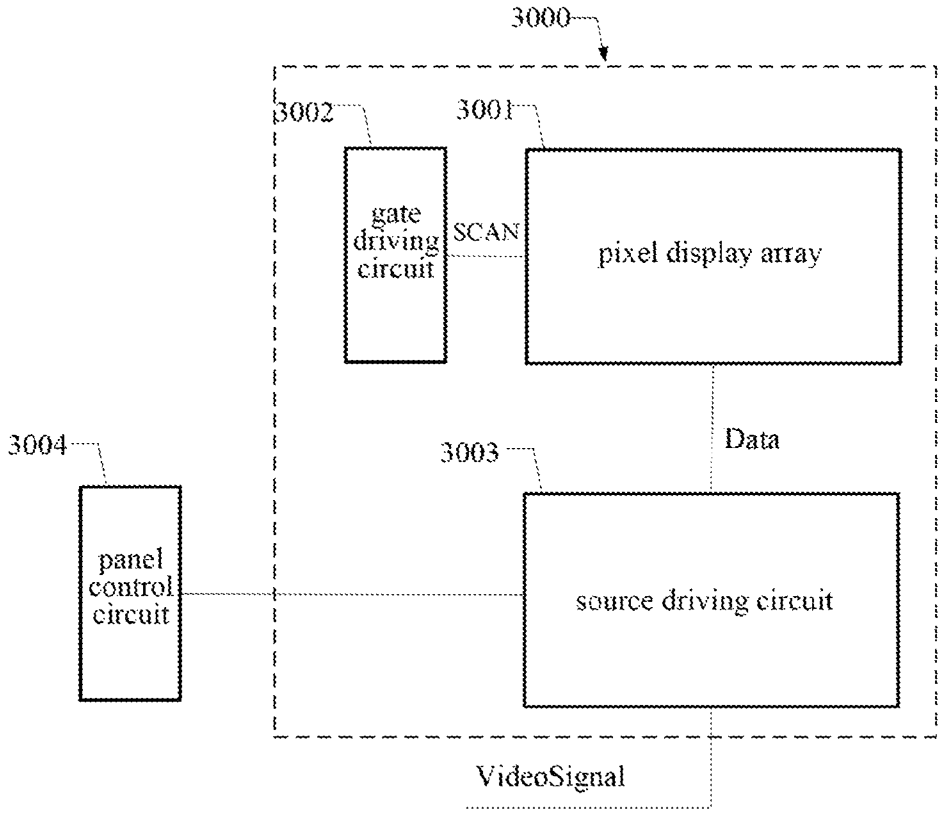
FIG. 3 is a schematic structural block diagram of an AMOLED display panel according to an embodiment of the present disclosure.

FIG. 3 is a schematic structural block diagram of an AMOLED display panel according to an embodiment of the present disclosure.

As shown in FIG. 3, the AMOLED display panel 3000 of the embodiment of the present disclosure includes a pixel display array 3001, a gate driving circuit 3002, and a source driving circuit 3003.

Further, the pixel display array 3001 can include a plurality of pixel circuits arranged in an array (not shown). Each pixel circuit includes an AMOLED as a light-emitting element, and a light-emitting state of the AMOLED is updated after each pixel circuit receives a corresponding data voltage Data. The number of the pixel circuits depends on the resolution of the AMOLED display panel 3000.

The gate driving circuit 3002 is adapted to provide a gate scan signal SCAN to the pixel circuit, and the gate scan signal SCAN is used for controlling an operation stage of the pixel circuit. For example, by applying the gate scan signal SCAN to respective ports of the pixel circuit, the pixel circuit can be controlled to enter operations stages such as reset, data voltage write-in, and light-emitting.

Generally, the AMOLED display panel 3000 displays an image or a video. Each frame of the image or the video is updated based on a digital video signal Video Signal output by an image sensor (not shown). The source driving circuit 3003 is provided with the digital video signal Video Signal and adapted to generate a data voltage Data according to the digital video signal Video Signal. The data voltage Data is input to a source of a transfer transistor in the respective pixel circuit to control the light-emitting state of the light-emitting element in the pixel circuit.

At present, the most AMOLED display panels are concentrated on LTPSTFT glass substrates, but their integration level is relatively low, PPI is limited, and the power consumption is relatively large. Therefore, an AMOLED on silicon display panel is a superior solution for achieving functions of easy carrying, high resolution and low power consumption. In the embodiment of the present disclosure, the pixel display array 3001, the gate driving circuit 3002, and the source driving circuit 3003 are integrated on the same chip substrate (i.e., a silicon substrate), and the source driving circuit 3003 is adapted to be coupled to a panel control circuit 3004 external to the chip substrate.

In a specific implementation, the panel control circuit 3004 can include one or more of following items: a power module, a clock module, a voltage reference module, an interface module, a digital processing module, and the like. However, it is not limited to that, and the panel control circuit 3004 can also include any other suitable circuit function modules. In a specific implementation, the interface module can be a serial port or a Mobile Industry Processor Interface (MIPI).

Further, the pixel display array 3001, the gate driving circuit 3002, and the source driving circuit 3003 include a large number of analog circuits and a small number of digital circuits. Therefore, the AMOLED display panel 3000 can be fabricated using, for example, a process based on a medium voltage (about 5 to 6 V). Since the medium voltage process is compatible with a low voltage process such as 3.3V, complexity of the technology process can be reduced, and the process cost can be decreased. Since the panel control circuit 3004 (for example, a power module, a clock module, a voltage reference module, and the like) is disposed to be external to the chip substrate of the AMOLED display panel 3000, it can be externally bound to the AMOLED display panel 3000 through an input/output (I/O) interface. There are generally more digital circuits included in the panel control circuit 3004, and a lower voltage (e.g., 1.8V) technology process is required. Therefore, the panel control circuit 3004 and the AMOLED display panel 3000 are separately fabricated, such that circuit complexity of the AMOLED display panel 3000 can be effectively reduced, and a utilization rate and a yield of a wafer can be separately improved, thereby further reducing the cost.

Further preferably, the AMOLED display panel 3000 is composed of only three circuits including the pixel display array 3001, the gate driving circuit 3002, and the source driving circuit 3003, thereby facilitating further reducing the process cost.

Figure 4:
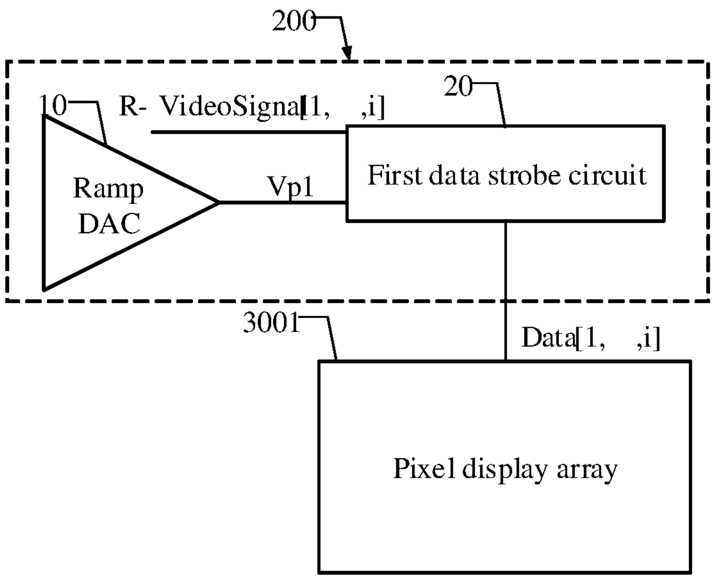
FIG. 4 is a schematic structural block diagram of a source driving circuit according to an embodiment of the present disclosure.

FIG. 4 shows a schematic structural block diagram of a source driving circuit according to an embodiment of the present disclosure.

The source driving circuit 200 (i.e., the source driving circuit 3003 in FIG. 3) of the embodiment of the present disclosure can include a ramp DAC 10 and a first data strobe circuit 20.

The ramp DAC 10 is adapted to output a first ramp voltage Vp1, and the first ramp voltage Vp1 varies linearly with a preset step over time within a preset voltage range. The ramp DAC 10 is set to be of M bits, M is a positive integer, and the step is associated with M. The first ramp voltage Vp1 can vary in a linearly increasing or linearly decreasing trend. The voltage range is typically associated with a reference voltage of the ramp DAC 10.

Here, a case where the first ramp voltage Vp1 varies in a linearly increasing manner will be described as an example. It is assumed that the first ramp voltage Vp1 varies linearly between 0 and 5V, and it is further assumed that M=8, then the step is equal to $5V/2^8=5V/256\approx19.5$ mV. It is assumed that a system clock frequency used in the source driving circuit 200 is 100 kHz, that is, a time interval between every two clock ticks is 10 μs, then time required for the first ramp voltage Vp1 to change from 0 to 5 V is 10 μs×256=2.56 ms. Therefore, the first ramp voltage Vp1 output by the ramp DAC 10 changes from 0 to 5V once every 2.56 ms, and a cycle reciprocates.

The first data strobe circuit 20 is provided with i associated digital video signals R-VideoSignal[1, . . . , *i*], and it is adapted to respectively generate, according to the respective associated digital video signal R-VideoSignal, a corresponding data strobe signal (not shown) at a first moment. The first moment is a moment associated with a value of the associated digital video signal R-VideoSignal, and the associated digital video signal R-VideoSignal is associated with a digital video signal (not shown). For example, the associated digital video signal R-VideoSignal can be equivalent to the digital video signal, and it is also possible that the digital video signal is obtained by bit number extension or bit number extraction. The data strobe signal is used for strobing the first ramp voltage Vp1 to be directly or indirectly used as a data voltage Data[1, . . . , *i*]. The data voltage Data[1, . . . , *i*] is used to control display states of the pixel circuit in the pixel display array 3001. The bit number of the respective digital video signal VideoSignal is N, M≤N, and i and N are positive integers.

For simplicity, a case where the associated digital video signal R-VideoSignal is equivalent to the digital video signal will be described as an example. In a specific implementation, i can be any value; preferably, i is associated with the resolution of the AMOLED display panel. It is assumed that the resolution of the AMOLED display panel is 1024×720, that is, the pixel display array 3001 has 1024 rows×720 columns of pixel circuits. For example, the source driving circuit 200 can perform, in parallel, the conversion processing on the digital video signals VideoSignal corresponding to all the columns of pixel circuits of each row in the pixel display array 3001, that is, 720 digital video signals VideoSignal (i.e., i can be 720), and the source driving circuit 200 performs the process of converting 720 digital video signals VideoSignal the corresponding data voltages Data for 1024 times. Without doubt, the source driving circuit 200 can perform, in parallel, the conversion processing on the digital video signals VideoSignal corresponding to all the rows of pixel circuits of each column in the pixel display array 3001, that is, 1024 digital video signals VideoSignal (i.e., i can be 1024).

The first case will be described as an example, in which i=720 and it is equal to the number of the columns of the pixel circuits in the pixel display array 3001, and the associated digital video signal R-VideoSignal is equivalent to the digital video signal.

In a specific implementation, 720 associated digital video signals R-VideoSignal are simultaneously transmitted to the first data strobe circuit 20. The first data strobe circuit 20 is adapted to generate 720 data strobe signals at the same or different moments, and the moment is related to the value of the respective associated digital video signal R-VideoSignal. Since the first ramp voltage Vp1 varies linearly, for example linearly increasing, when the data strobe signal is generated, the first ramp voltage Vp1 may be strobed to be directly or indirectly used as the data voltage Data corresponding to the respective associated digital video signal R-VideoSignal. Taking a case where the associated digital video signal R-VideoSignal is 10010011 (139 in decimal) as an example, since the reference voltage is 5V, the data voltage Data obtained by digital-to-analog conversion of the associated digital video signal R-VideoSignal should be 2.71V, so that the first data strobe circuit 20 can generate a corresponding data strobe signal when the first ramp voltage Vp1 is 2.71V. Further, the first data strobe circuit 20 can identify the value (139 in decimal) of the associated digital video signal R-VideoSignal and determine the moment at which the first ramp voltage Vp1 is 2.71V so as to generate the data strobe signal.

It is understood by those skilled in the art that the data voltage Data is adapted to drive the light-emitting elements, i.e., the AMOLED in the pixel circuits in the pixel display array 3001, and a magnitude of the data voltage Data is related to a magnitude of a driving current for driving the AMOLED. Therefore, the i data voltages Data[1, . . . , *i*] can control the display state of the pixel display array 3001.

It should be noted that the first ramp voltage Vp1 can vary in a linearly decreasing manner. In a specific implementation, the first data strobe circuit 20 can identify a complement (116 in decimal) of a binary value of the associated digital video signal R-VideoSignal[1, . . . , *i*], and determine the moment at which the first ramp voltage Vp1 is 2.71V based on the complement thereof, to generate the data strobe signal.

In an AMOLED display panel, the number of pixels (or referred to pixel density) is generally used to measure fidelity of the display panel. The number of pixels represents the number of pixels per inch (Pixels Per Inch, PPI for short). The higher PPI value means that the density in which the AMOLED display panel can display an image is higher and the fidelity is higher. In general, the higher PPI leads to the higher resolution of the AMOLED display panel. Therefore, the resolution of the AMOLED display panel will inevitably increase continuously, that is, the number of the pixel circuits in the pixel display array 3001 increases continuously. However, the source driving circuit in the related art cannot meet this requirement.

Further, an architecture of the source driving circuit 200 in this embodiment may perform conversion processing on the i digital video signals VideoSignal[1, . . . , *i*] in parallel, to correspondingly obtain i data voltages Data[1, . . . , *i*], and there may be only one ramp DAC 10. When the resolution of the AMOLED display panel is increased, the number of the ramp DAC 10 can still be maintained unchanged. Compared with the related art, the solution of this embodiment has a simple structure and can effectively reduce the occupied chip area. In addition, since there is no resistor architecture, unevenness of the data voltages Data[1, . . . , *i*] caused by a large amount of resistance value deviations of resistors exist, the uniformity of the display panel is good.

Embodiment 1

Figure 5:
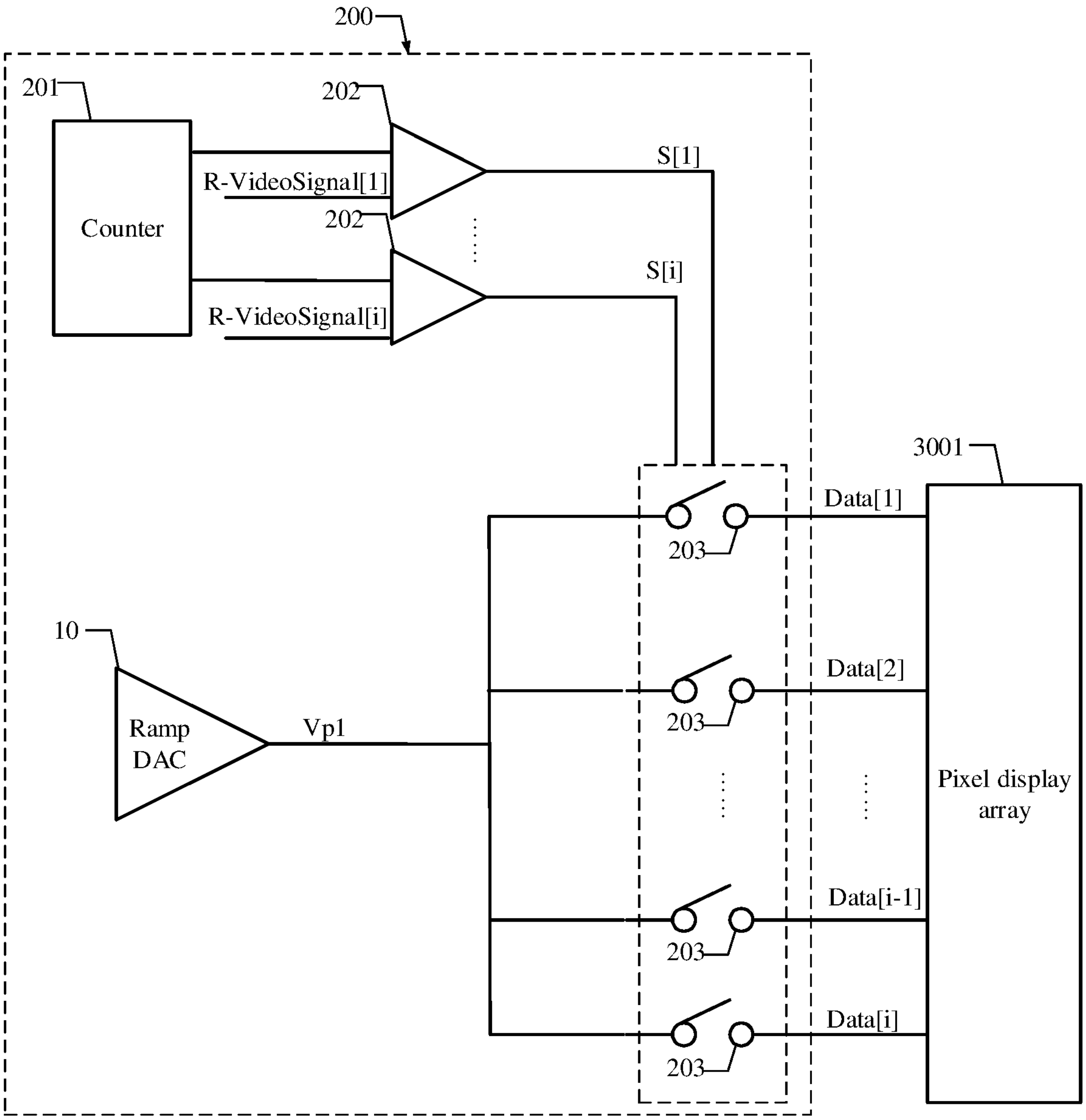
FIG. 5 is a schematic diagram of a circuit structure of another source driving circuit according to an embodiment of the present disclosure.

FIG. 5 is a schematic diagram of a circuit structure of another source driving circuit according to an embodiment of the present disclosure.

The source driving circuit 200 shown in FIG. 5 may include a ramp DAC 10 and a first data strobe circuit (not labeled in the drawing). For more information about the ramp DAC 10 and the first data strobe circuit, reference can be made to the related description of the source driver circuit 200 shown in FIG. 4, and it will not be described herein.

In the present embodiment, M=N. For example, the bit number of the ramp DAC 10 and the bit number of the respective digital video signal VideoSignal[1, . . . , *i*] are both equal to 8, but there is no limitations on that. M and N can be any other suitable positive integers. The respective associated digital video signal R-VideoSignal[1, . . . , *i*] is associated with a corresponding digital video signal VideoSignal[1, . . . , *i*]. For the sake of simplicity, the present embodiment is still described by taking the case where the two are equivalent as an example.

Preferably, the first ramp voltage Vp1 varies in a linearly increasing manner. The first data strobe circuit can include a counter 201, i numerical comparators 202, and i first switches 203.

The i numerical comparators 202 are adapted to respectively compare a counting result (not shown) of the counter 201 with a value of the corresponding associated digital video signal R-VideoSignal[1, . . . , *i*] and generate a corresponding data strobe signal S[1, . . . , *i*] when the two are equal. A first terminal of each first switch 203 is provided with the first ramp voltage Vp1, a second terminal of each first switch 203 outputs the data voltage Data[1, . . . , *i*], and the first switch 203 is turned on in response to the data strobe signal S[1, . . . , *i*].

A case will be further described as an example where the resolution of the AMOLED display panel is 1024×720, i=720, the first ramp voltage Vp1 varies linearly between 0 and 5V, the step is equal to 19.5 mV, the system clock frequency is 100 kHz, and the time required for the first ramp voltage Vp1 to change from 0 to 5 V is 10 μs×256=2.56 ms.

When the first ramp voltage Vp1 rises from 0, the counter 201 starts counting. The first ramp voltage Vp1 rises by 19.5 mV every 10 μs. Taking a case where the first VideoSignal [1] in the 720 associated digital video signals R-VideoSignal is 10010011 (139 in decimal) as an example, when the counting result of the counter 201 is equal to 10010011 (139 in decimal), the first ramp voltage Vp1 rises by 139 times from 0 at the step of 19.5 mV, it takes 1.39 ms and an amplitude is 139×19.5 mV≈2.71V. At this time, the corresponding data strobe signal S[1] is generated, and the corresponding first switch 203 is turned on, then the data voltage Data[1] obtained by digital-analog conversion of the first associated digital video signal R-VideoSignal[1] is 2.71V. It has been verified that when the reference voltage is 5V, an analog voltage amplitude corresponding to 10010011 (139 in decimal) is 2.71V. It is assumed that the second associated digital video signal R-VideoSignal[2] is 10010100 (140 in decimal), then when the counting result of the counter 201 is equal to 10010100 (140 in decimal), a corresponding data strobe signal S[2] is generated. It takes 1.40 ms, the corresponding first switch 203 is turned on, and the resulting data voltage Data[2] is about 2.73V.

Similarly, the remaining 718 associated digital video signals R-VideoSignal[3 . . . 720] have the same conversion process as the first associated digital video signal R-VideoSignal[1] and the second associated digital video signal R-VideoSignal[2], and the turn-on timings of the corresponding respective first switches 203 may be the same or different. Within 2.56 ms during which the first ramp voltage Vp1 changes from 0 to 5 V, all 720 associated digital video signals R-VideoSignal are completely converted into analog voltages.

In a variation of this embodiment, the first ramp voltage Vp1 may vary in a linearly decreasing manner. For example, the first ramp voltage Vp1 changes from 5V to 0, and the others are the same as in the previous embodiment. When the associated digital video signal R-VideoSignal is 10010011 (139 in decimal), a corresponding data strobe signal S can be generated at the time when the counting result of the corresponding counter 201 is equal to the complement 01101100 (decimal 116) of its binary value. At this time, the first ramp voltage Vp1 is 5V−116×19.5 mV≈2.71V, and the voltage is strobed as the data voltage Data for being output.

In another variation of this embodiment, a starting point of the first ramp voltage Vp1 when linearly increasing may not be 0, for example, rising from 1V to 6V. The first data strobe circuit can further include a bias circuit (not shown). The bias circuit is adapted to subtract 1V from the obtained corresponding data voltage Data, i.e., subtracting a deviation of a starting point, from which the first ramp voltage Vp1 linearly increases, with respect to 0.

Embodiment 2

Figure 6:
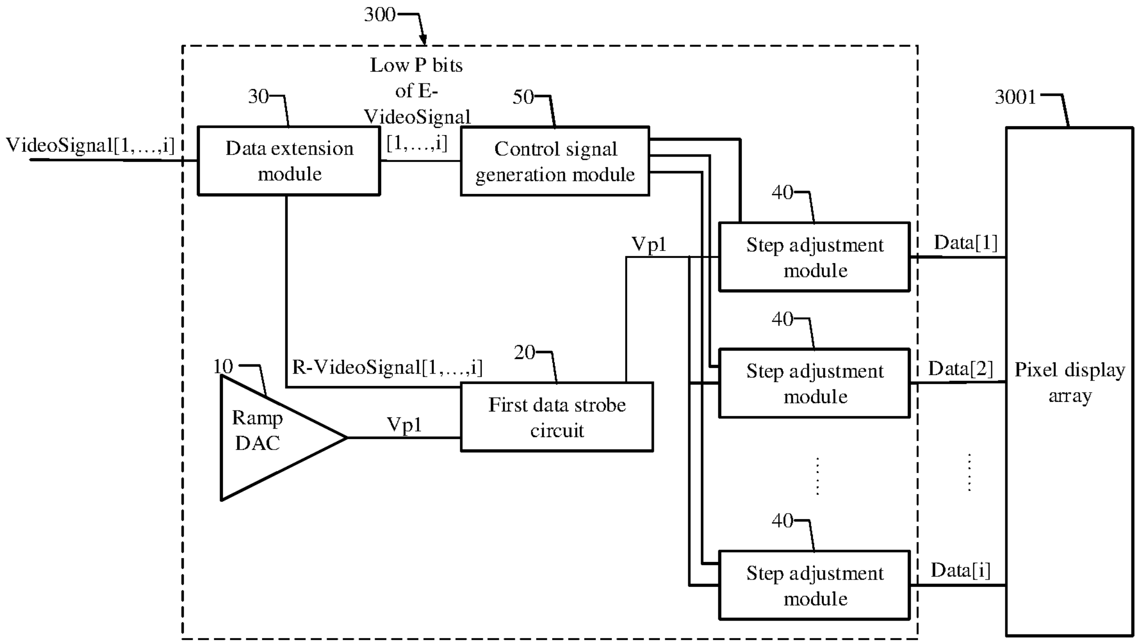
FIG. 6 is a schematic diagram of a circuit structure of still another source driving circuit according to an embodiment of the present disclosure.

FIG. 6 illustrates a source driving circuit 300, and the source driving circuit 300 can include a ramp DAC 10 and a first data strobe circuit 20. For more information about the ramp DAC 10 and the first data strobe circuit 20, reference can be made to the related description of the source driver circuit 200 shown in FIG. 4 and FIG. 5, and details will not be described herein.

In this embodiment, M=N. The source driving circuit 300 can further include a data extension module 30, i step adjustment modules 40, and a control signal generation module 50.

The data extension module 30 is adapted to map each digital video signal having a bit number of N to an extended digital video signal (not shown) having N+P bits in accordance with a preset lookup table, where P is a positive integer.

In a specific implementation, the lookup table can be pre-stored in a memory belonging to the AMOLED display panel (not shown). The AMOLED display panel can map the digital video signal VideoSignal[1, . . . , *i*] to the extended digital video signal R-VideoSignal[1, . . . , *i*] and then input them to the source driving circuit 300. In general, a mapping relationship between the two types of signals is non-linear. It is assumed that P=2. For example, the digital video signal VideoSignal1010 is mapped to an extended digital video signal R-VideoSignal011000, the digital video signal VideoSignal1011 is mapped to an extended digital video signal R-VideoSignal011111, and the digital video signal VideoSignal1100 is mapped to an extended digital video signal R-VideoSignal100101, and so on. It should be noted that the above conversion manner is only an example, and in an actual implementation, the mapping relationship between the two may be adjusted in the memory.

The step adjustment module 40 is adapted to perform an amplitude adjustment on the first ramp voltage Vp1 to obtain a corresponding second ramp voltage (not shown), such that the amplitude of the second ramp voltage is equal to a value obtained by the first ramp voltage Vp1 minus the preset step and then plus a product of the preset step and a voltage-division factor, where a voltage-division factor is one of $2^P$ sub-voltage-division factors, and the $2^P$ sub-voltage-division factors are in an arithmetic progression with a first term of 0 and a tolerance of $1/2^P$.

Since the first ramp voltage Vp1 varies linearly, and the first ramp voltage Vp1 increases or decreases by the preset step every unit time, it is assumed that the preset step is 1V, the first ramp voltage Vp1 is 5V and P=2, then the voltage-division factor is one of 4 sub-voltage-division factors 0, ¼, ½ and ¾, and the amplitude of the second ramp voltage is equal to 5V−1V+1V×voltage-division factor (for example, ¼)=4.25V. That is, 4 subdivisions are further completed in a range of 4V to 5V for the first ramp voltage Vp1 of 5V. M, N, and P are not limited to the values in the above examples and may be any other suitable positive integers.

The control signal generation module 50 is adapted to control a magnitude of the voltage-division factor in the respective step adjustment module 40 based on a low P bit of the extended digital video signal E-VideoSignal[1, . . . , *i*]. Further, the associated digital video signal R-VideoSignal [1, . . . , *i*] comprises high N bits of the extended digital video signal E-VideoSignal[1, . . . , *i*] and is used for generating the data strobe signal. The second ramp voltage is used as the data voltage Data.

Figure 7:
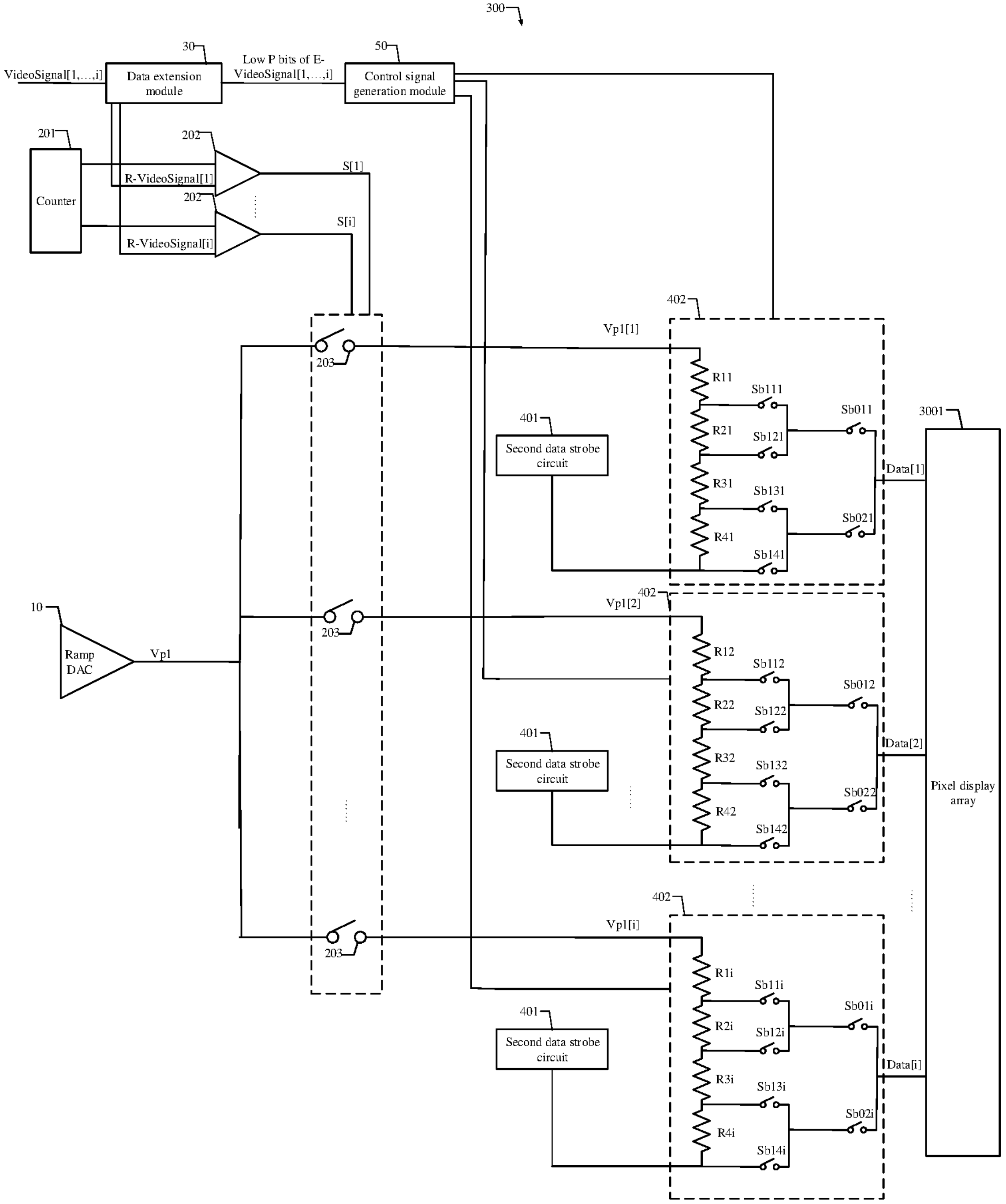
FIG. 7 is a schematic diagram of a circuit structure of yet still another source driving circuit according to an embodiment of the present disclosure.

Referring to FIG. 6 and FIG. 7 together, in a specific implementation, each of the step adjustment modules 40 can include a second data strobe circuit 401 and a weighted resistor divider network 402.

The second data strobe circuit 401 is provided with the first ramp voltage Vp1[1, . . . , *i*], and it is adapted to be turned on at a second moment, to transmit the first ramp voltage Vp1 of the second moment to a second input terminal of the weighted resistor divider network 402. The second moment is a moment associated with a value of high N bits of the extended digital video signal E-VideoSignal[1, . . . , *i*] minus 1.

A first input terminal of the weighted resistor divider network 402 is coupled to an output terminal of the first data strobe circuit 20, such that the first input terminal of the weighted resistor divider network 402 is provided with the first ramp voltage Vp1 corresponding to the first moment.

It is assumed that the first moment is a moment at which the counting result of the counter 201 is associated with the value of the high N bits (e.g., 1001) of the extended digital video signal E-VideoSignal[1, . . . , *i*], then the second moment is a moment at which the counting result of the counter 201 is associated with the value of the high N bit of the extended digital video signal E-VideoSignal[1, . . . , *i*] minus 1 (i.e., 1000). Since a difference between the values corresponding to the two moments is 1 (digital code), a voltage difference between a voltage (e.g., 5V) inputted to the first input terminal of the weighted resistor divider network 402 and a voltage (e.g., 4V) inputted to the second input terminal is the preset step (1V).

Further, the weighted resistor divider network 402 is adapted to perform, based on the first ramp voltage Vp1 of the second moment, voltage-division on the preset step according to the voltage-division factor, to obtain the second ramp voltage. Reference can be made to the related descriptions in the foregoing examples, and details will not be described herein.

In a specific description, the second data strobe circuit 401 transmitting the first ramp voltage Vp1 of the second moment to the second input terminal of the weighted resistor divider network 402 at the second moment can be executed based on the value of the high N bit of the extended digital video signal E-VideoSignal[1, . . . , *i*] minus 1. For example, the second data strobe circuit 401 has a switch (not shown) therein, and it is turned on at the second moment, to transmit the first ramp voltage Vp1. Further, the second moment can be determined by means of the counter and the numerical comparator. For example, the counter 201 and the i numerical comparators 202 in the first data strobe circuit 20 can be reused, as long as when the counting result is the high N bits of the extended digital video signal E-VideoSignal[1, . . . , *i*] minus 1, a corresponding control signal is generated to control the switch to be turned on.

In a non-limiting example, the weighted resistor divider network 402 can include: $2^P$ voltage-division resistors sequentially connected end to end, $2^P$ second switches, and $2^{P-1}$ third switches. A connection relationship among them will be described by taking only the case of P=2 shown in FIG. 7 as an example.

Specifically, the voltage-division resistors R11, R21, R31, and R41 are connected end to end, a first terminal of the first voltage-division resistor R11 is coupled to the output terminal of the first data strobe circuit 20, and a second terminal of the last voltage-division resistor R41 is coupled to the output terminal of the second data strobe circuit 402; a first terminal of the $j^{th}$ second switch is coupled to a second terminal of a $j^{th}$ voltage-division resistor, $1 \leq j \leq 2^P$, that is, a first terminal of a second switch Sb111 is coupled to a second terminal of the voltage-division resistor R11, a first terminal of a second switch Sb121 is coupled to a second terminal of a voltage-division resistor R21, a first terminal of a second switch Sb131 is coupled to a second terminal of a voltage-division resistor R31, a first terminal of a second switch Sb141 is coupled to a second terminal of a voltage-division resistor R41; and a second terminal of a $k^{th}$ second switch is coupled to a second terminal of a $(k+1)^{th}$ second switch, where k is an odd number and $1 \leq k \leq 2^P-1$. That is, a second terminal of the second switch Sb111 is coupled to a second terminal of the second switch Sb121, a second terminal of the second switch Sb131 is coupled to a second terminal of the second switch Sb141; a first terminal of a $m^{th}$ third switch is coupled to a second terminal of a $(2\times m-1)^{th}$ second switch, $1 \leq m \leq 2^{P-1}$, second terminals of $2^{P-1}$ third switches are coupled, to output the second ramp voltage; that is, a first terminal of a third switch Sb011 is coupled to the second terminal of the second switch Sb111, a first terminal of a third switch Sb021 is coupled to the second terminal of the second switch Sb131, and second terminals of the third switch Sb011 and the third switch Sb021 are coupled, to output the second ramp voltage.

Similarly, for specific connection manners of voltage-division resistors R12, 22, 32, 42, . . . , 1*i*, 2*i*, 3*i* and 4*i*, second switches Sb112, 122, 132, 142, 11*i*, 12*i*, 13*i* and 14*i*, and third switches Sb012, 022, . . . , 01*i*, 02*i*, reference can be made to the above description, and details will not be described herein.

Taking a case where the first ramp voltage Vp1[1] is divided by a sub-voltage-division factor of ¼ as an example, the control signal generation module 50 can control the second switch Sb131 and the third switch Sb021 to be turned on and control the second switch Sb141 and the third switch Sb011 to be turned off, but it has no limitation on on/off states of the second switches Sb111 and Sb121. If other sub-voltage-division factors are to be achieved, the on/off states of the corresponding second switch and the third switch can be adjusted. When P is of other value or for other first ramp voltage Vp1, the voltage-division method is the same as that of the present example, and it will not be exemplified herein.

It should be noted that the step adjustment module 40 is not limited to the above solution. For example, it can be an adjustable gain circuit and it can be composed of an operational amplifier circuit, and $2^P$ sub-voltage-division factors are set by switching an amplification factor. As another example, the step adjustment module 40 can further include $2^P$ output terminals, and an amplification factor of the second ramp voltage output by each output terminal relative to the first ramp voltage Vp1 corresponds to the sub-voltage-division factor. A decoder can be used to make a selection on the $2^P$ output terminals, and a selection signal of the decoder can be generated by the low P bits of the extended digital video signal E-VideoSignal[1, . . . , *i*].

In this embodiment, preferably, the first ramp voltage Vp1 varies in a linearly increasing manner. The first data strobe circuit can include a counter 201, i numerical comparators 202, and i first switches 203. For more information on the counter 201, the i numerical comparators 202 and the i first switches 203, reference can be made to the related description of Embodiment 1.

In general, the value of the high N bits of the extended digital video signal E-VideoSignal[1, . . . , *i*] determines when the first ramp voltage Vp1 is strobed, and the value of the high N bits determines, based on a “rough adjustment” of the preset voltage range by the ramp DAC 10, a stage at which the strobing is made. The low P bits of the extended digital video signal E-VideoSignal[1, . . . , *i*] determine how to perform a fine adjustment by the step adjustment module 40 based on the first ramp voltage Vp1. Specifically, an output of the ramp DAC 10 having M-bit precision is indirectly coupled to the step adjustment module 40 having P-bit precision. A Least Significant Bit (LSB) output by the ramp DAC 10 is $V/2^M$, and V is a voltage range of the first ramp voltage Vp1. The LSB of the second ramp voltage output by the step adjustment module 40 is obtained through dividing one LSB of the ramp DAC 10 by $2^P$.

In this embodiment, the precision of the ramp DAC 10 is M, where M=N. By extending the bit number of the digital video signal VideoSignal through the data extension module 30, the step adjustment module 40 can make, according to the low P bits of the extended digital video signal E-VideoSignal[1, . . . , *i*] obtained by extension, a step adjustment on the P-bit precision of the first ramp voltage Vp1 output by the ramp DAC 10, and cascade of the two together achieves output of the data voltage Data[1, . . . , *i*] having M+P bit precision. Further, firstly, provision of the data extension module 30 can achieve high conversion precision of the digital video signal VideoSignal based on low precision, which is conducive to improving the display effect of the AMOLED display panel; secondly, since when the M+P bit conversion precision is achieved by simply using the ramp DAC 10 and the conversion precision is relatively large, the one LSB of the ramp DAC 10 may be smaller than an offset voltage of its internal operational amplifier, which is impossible for the ramp DAC 10 to guarantee the M+P-bit precision, while adopting the cascaded architecture of the low-precision ramp DAC 10 and the step adjustment module 40 is more conducive to guarantee the M+P bit conversion precision; again, as the resolution increases, an output load of the ramp DAC 10 becomes larger, and the higher precision of the input signal leads to the shorter response time, while adopting the cascading method can effectively solve the problem that the load of the ramp DAC 10 is too large and the response is too slow in the case of high-precision input signals.

In a preferred variation, in order to prevent the load from being too large when using one ramp DAC 10, in a case where a circuit area allows, a plurality of ramp DACs (not shown) can be used to equalize the load. The plurality of the ramp DACs can generate the first ramp voltage Vp1 by controlled segmentation, which will not be described here.

For more information about this embodiment, reference can be made to the related description of Embodiment 1, and details will not be described herein again.

Embodiment 3

Figure 8:
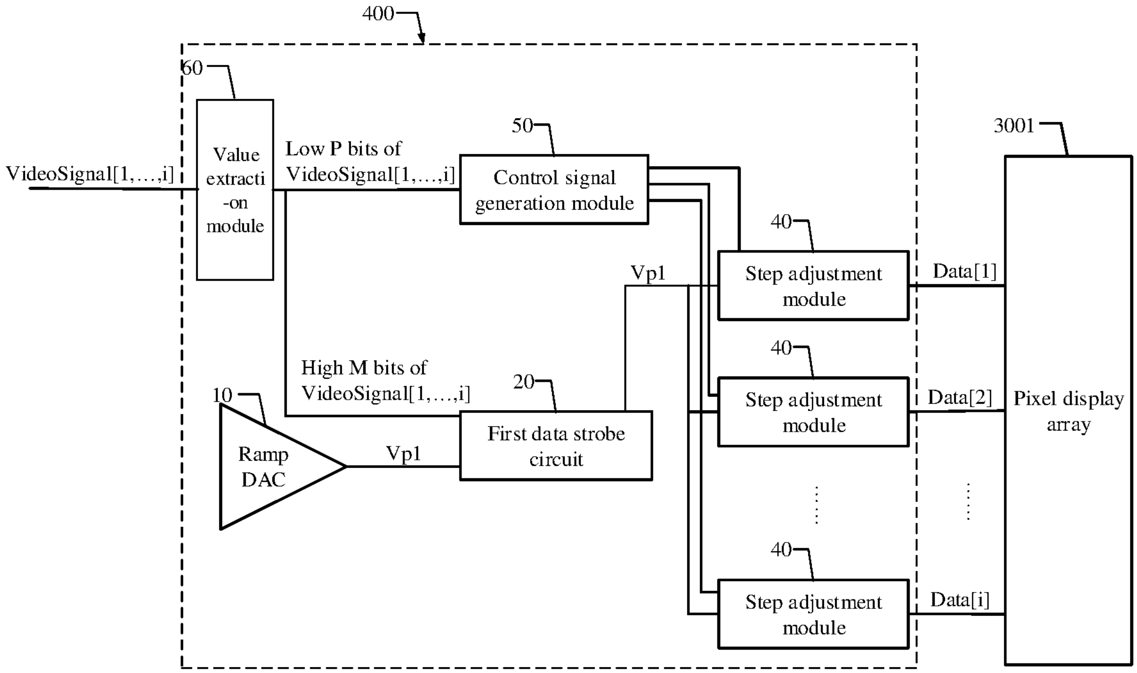
FIG. 8 is a schematic diagram of a circuit structure of yet still another source driving circuit according to an embodiment of the present disclosure.

FIG. 8 is a schematic diagram of the circuit structure of still another source driving circuit according to an embodiment of the present disclosure.

A source driving circuit 400 shown in FIG. 8 can include a ramp DAC 10 and a first data strobe circuit 20. For more information about the ramp DAC 10 and the first data strobe circuit 20, reference can be made to the related description of the source driver circuit 200 shown in FIG. 4 and FIG. 5, and details will not be described herein.

In the present embodiment, M+P=N, where P is a positive integer. For example, M is 8, P is 2, and N is 10, but the present disclosure is not limited thereto. The associated digital video signal R-VideoSignal[1, . . . , *i*] comprises the high M bits of the digital video signal VideoSignal[1, . . . , *i*].

The source driving circuit 400 can further include i step adjustment modules 40 and a control signal generation module 50.

The step adjustment module 40 is adapted to perform an amplitude adjustment on the first ramp voltage Vp1, to obtain a corresponding second ramp voltage (not shown), such that the amplitude of the second ramp voltage is equal to a value obtained by the first ramp voltage Vp1 minus the preset step and then plus a product of the preset step and a voltage-division factor, where the voltage-division factor is one of $2^P$ sub-voltage-division factors, and the $2^P$ sub-voltage-division factors are in an arithmetic progression with a first term of 0 and a tolerance of $\frac{1}{2^P}$.

Since the first ramp voltage Vp1 varies linearly, and the first ramp voltage Vp1 increases or decreases by the preset step every unit time, it is assumed that the preset step is 1V, the first ramp voltage Vp1 is 5V and P=2, then the voltage-division factor is one of 4 sub-voltage-division factors 0, ¼, ½ and ¾, and the amplitude of the second ramp voltage is equal to 5V−1V+1V×voltage-division factor (for example, ¼)=4.25V. That is, 4 subdivisions are further completed in a range of 4V to 5V for the first ramp voltage Vp1 of 5V. M, N, and P are not limited to the values in the above examples and may be any other suitable positive integers.

The control signal generation module 50 is adapted to control a magnitude of the voltage-division factor in the respective step adjustment module 40 according to low P bits of the extended digital video signal E-VideoSignal[1, . . . , *i*]. The second ramp voltage is used as the data voltage Data.

In a specific implementation, each of the step adjustment modules 40 can include a second data strobe circuit (not shown) and a weighted resistor divider network (not shown).

The second data strobe circuit is provided with the first ramp voltage Vp1, and it is adapted to be turned on at a second moment, to transmit the first ramp voltage Vp1 of the second moment to a second input terminal of the weighted resistor divider network. The second moment is a moment associated with a value of high M bits of the digital video signal VideoSignal[1, . . . , *i*] minus 1.

A first input terminal of the weighted resistor divider network is coupled to an output terminal of the first data strobe circuit 20, such that the first input terminal of the weighted resistor divider network is provided with the first ramp voltage Vp1 corresponding to the first moment. The weighted resistor divider network 402 is adapted to perform, based on the first ramp voltage Vp1 of the second moment, voltage-division on the preset step according to the voltage-division factor, to obtain the second ramp voltage.

In a specific description, the second data strobe circuit transmitting the first ramp voltage Vp1 of the second moment to the second input terminal of the weighted resistor divider network at the second moment can be executed based on the value of the high M bits of the digital video signal VideoSignal[1, . . . , *i*] minus 1. For example, the second data strobe circuit has a switch (not shown) therein, and it is turned on at the second moment, to transmit the first ramp voltage Vp1. Further, the second moment can be determined by means of the counter and the numerical comparator. For example, the counter 201 and the i numerical comparators 202 in FIG. 5 or FIG. 7 can be reused, as long as when the counting result is the high M bits of the digital video signal VideoSignal[1, . . . , *i*] minus 1, a corresponding control signal is generated to control the switch to be turned on.

In a non-limiting example, the weighted resistor divider network can include: $2^P$ voltage-division resistors sequentially connected end to end, $2^P$ second switches, and $2^{P-1}$ third switches. Specifically, a first terminal of the first voltage-division resistor is coupled to the output terminal of the first data strobe circuit, and a second terminal of the last voltage-division resistor is coupled to the output terminal of the second data strobe circuit; a first terminal of the $j^{th}$ second switch is coupled to a first terminal of a $j^{th}$ voltage-division resistor, $1 \le j \le 2^P$; a second terminal of a $k^{th}$ second switch is coupled to a second terminal of a $(k+1)^{th}$ second switch, where k is an odd number and $1 \le k \le 2^P-1$; a first terminal of a $m^{th}$ third switch is coupled to a second terminal of a $(2\times m-1)^{th}$ second switch, $1 \le m \le 2^{P-1}$, and second terminals of $2^{P-1}$ third switches are coupled, to output the second ramp voltage.

For more information about the step adjustment module 40 and the weighted resistor divider network, reference can be made to the related description of Embodiment 2, and details will not be described herein.

It should be noted that the step adjustment module 40 is not limited to the above solution. For example, it can be an adjustable gain circuit and composed of an operational amplifier circuit, and $2^P$ sub-voltage-division factors are set by switching an amplification factor. As another example, the step adjustment module 40 can further include $2^P$ output terminals, and an amplification factor of the second ramp voltage output by each output terminal relative to the first ramp voltage Vp1 corresponds to the sub-voltage-division factor. A decoder can be used to make a selection on the $2^P$ output terminals, and a selection signal of the decoder can be generated by the low P bits of the digital video signal VideoSignal[1, . . . , *i*].

In this embodiment, preferably, the first ramp voltage Vp1 varies in a linearly increasing manner. The first data strobe circuit 20 can include a counter 201, i numerical comparators 202, and i first switches 203. For more information on the counter 201, the i numerical comparators 202 and the i first switches 203, reference can be made to the related description of Embodiment 1.

Further, the source driving circuit 300 can further include a value extraction module 60, which is adapted to extract values of the high M bits and the low P bits of the respective digital video signals VideoSignal[1, . . . , *i*].

In a specific implementation, the value extraction module 60 can first cache the respective digital video signal VideoSignal[1, . . . , *i*], such that while performing conversion processing on the cached batch of digital video signals VideoSignal[1, . . . , *i*], the source driver circuit 400 can receive the next batch of digital video signals VideoSignal[1, . . . , *i*], to increase the system response rate.

In general, the value of the high N bits of the extended digital video signal E-VideoSignal[1, . . . , *i*] determines when the first ramp voltage Vp1 is strobed, and the value of the high M bits determines, based on a "rough adjustment" of the preset voltage range by the ramp DAC 10, a stage at which the strobing is made. The low P bits of the digital video signal VideoSignal[1, . . . , *i*] determine how to perform a fine adjustment by the step adjustment module 40 based on the first ramp voltage Vp1. Specifically, an output of the ramp DAC 10 having M bit precision is indirectly coupled to the step adjustment module 40 having P-bit precision. A Least Significant Bit (LSB) output by the ramp DAC 10 is $V/2^M$, and V is a voltage range of the first ramp voltage Vp1. The LSB of the second ramp voltage output by the step adjustment module 40 is obtained through dividing one LSB of the ramp DAC 10 by $2^P$.

In this embodiment, the precision of the ramp DAC 10 is M, and the step adjustment module 40 performs a step adjustment on the P-bit precision of the first ramp voltage Vp1 output by the ramp DAC 10, such that cascade of the two together achieves output of the data voltage Data at N-bit precision. Further, firstly, adopting a cascade method can improve the precision of the obtained data voltage Data[1, . . . , *i*], to allow input of high-precision digital video signal VideoSignal[1, . . . , *i*], preferably, N≥8, which is conducive to achieving high-precision display effect of the AMOLED display panel; secondly, since when the N-bit conversion precision is achieved by simply using the ramp DAC 10 and N is relatively large, the one LSB of the ramp DAC 10 may be smaller than an offset voltage of its internal operational amplifier, which is impossible for the ramp DAC 10 to guarantee the N-bit precision, while adopting the cascaded architecture of the low-precision ramp DAC 10 and the second step adjustment module 40 is more conducive to guaranteeing the M+P-bit conversion precision; again, as the resolution increases, an output load of the ramp DAC 10 becomes larger, and the higher precision of the input signal leads to the shorter response time, while adopting the cascading method can effectively solve the problem that the load of the ramp DAC 10 is too large and the response is too slow in the case of high-precision input signals.

In the present embodiment, in order to prevent the load from being too large when using one ramp DAC 10, in a case where a circuit area allows, a plurality of ramp DACs (not shown) can be used to equalize the load. The plurality of the ramp DACs can generate the first ramp voltage Vp1 by controlled segmentation, which will not be described here.

For more information about this embodiment, reference can be made to the related description of Embodiment 1 and Embodiment 2, and details will not be described herein again.

It should be noted that each of the first switch 203, the second switch, and the third switch herein can include a transistor, which can be a NMOS transistor or a PMOS transistor, and a logic high level or a logic low level is accordingly applied to its control terminal to turn it on, but the present disclosure is not limited thereto. For example, each switch can also be a triode or other switching devices.

The "logic high level" and the "logic low level" are relative logic levels. The "logical high level" refers to a level range that can be identified as a digital signal "1", and the "logical low level" refers to a level range that can be identified as a digital signal "0". The specific level ranges are not specifically limited.

It should also be noted that the label R-VideoSignal illustrated in FIGS. 4 to 7 herein denotes one of the i associated digital video signals R-VideoSignal[1, . . . , *i*], the label VideoSignal denotes one of the i digital video signals VideoSignal[1, . . . , *i*], the label E-VideoSignal denotes one of the i extended digital video signals E-VideoSignal[1, . . . , *i*], the label Data denotes one of the i data voltages Data[1, . . . , *i*], and the label S denotes one of the data strobe signals S[1, . . . , *i*]. The labels R-VideoSignal, VideoSignal, E-VideoSignal, Data, and S are not separately shown in the drawings of the present specification.

An embodiment of the present disclosure also discloses an image display device. The image display device can include the AMOLED display panel 3000 and the panel control circuit 3004 external to the chip substrate shown in FIG. 3. The source driving circuit 3003 in the AMOLED display panel 3000 can adopt the source driving circuit shown in any one of FIG. 4 to FIG. 8. The AMOLED display panel in the embodiment of the present disclosure can take into account of both the process cost and resolution. Therefore, the image display device of the present embodiment also has certain advantages in the process cost and the resolution.

Although the present disclosure has been disclosed above, the present disclosure is not limited thereto. Any person skilled in the art can make various changes and modifications without departing from the spirit and scope of the present disclosure, and the scope of the present disclosure should be determined by the scope defined by the claims.

What is claimed is:

1. An AMOLED display panel, comprising:

a pixel display array comprising a plurality of pixel circuits arranged in an array;

a gate driving circuit adapted to provide a gate scan signal to the plurality of pixel circuits, the gate scan signal being used to control an operation stage of the plurality of pixel circuits; and a source driving circuit provided with a digital video signal and adapted to generate a data voltage in accordance with the digital video signal, the data voltage being used to control a light-emitting state of a light-emitting element in the plurality of pixel circuits, the source driving circuit comprising a ramp Digital-to-Analog Converter adapted to output a first ramp voltage, the first ramp voltage varying linearly with a preset step over time within a preset voltage range; and a first data strobe circuit provided with i associated digital video signals and adapted to respectively generate a corresponding data strobe signal based on each of the associated digital video signals at a first moment associated with a value of the associated digital video signals, each of the associated digital video signals being associated with a digital video signal, the data strobe signal being used to strobe the first ramp voltage to be directly or indirectly used as a data voltage, and the data voltage being used to control a display state of the plurality of pixel circuits in the display panel;

wherein the ramp Digital-to-Analog Converter is of M bits, and a bit number of the respective digital video signal is N, wherein M is less than or equal to N, wherein i, M and N are positive integers, and wherein the pixel display array, the gate driving circuit and the source driving circuit are integrated on a same chip substrate, and the source driving circuit is adapted to be coupled to a panel control circuit external to the chip substrate.

2. The AMOLED display panel according to claim 1, wherein the panel control circuit comprises one or more of a power module, a clock module, or a voltage reference module.

3. The AMOLED display panel according to claim 1, wherein M=N, and the first ramp voltage varies in a linearly increasing manner; and the first data strobe circuit comprises:

a counter;

i numerical comparators adapted to respectively compare a counting result of the counter with a value of a corresponding one of the associated digital video signals and generate a corresponding data strobe signal when the counting result and the value are equal; and i first switches, each of the i first switches having a first terminal provided with the first ramp voltage and a second terminal outputting the data voltage, and each of the i first switches being turned on in response to the data strobe signal.

4. The AMOLED display panel according to claim 1, wherein M=N, and the source driving circuit further comprises:

a data extension module adapted to map the respective digital video signal having a bit number of N to an extended digital video signal having N+P bits according to a preset lookup table, where P is a positive integer;

i step adjustment modules adapted to perform an amplitude adjustment on the first ramp voltage to obtain a corresponding second ramp voltage in such a manner that an amplitude of the second ramp voltage is equal to a value obtained by the first ramp voltage minus the preset step plus a product of the preset step and a voltage-division factor, where the voltage-division factor is one of $2^P$ sub-voltage-division factors, the $2^P$ sub-voltage-division factors are in an arithmetic progression with a first term of 0 and a tolerance of $1/2^P$; and a control signal generation module adapted to control a magnitude of the voltage-division factor in each of the i step adjustment modules according to low P bits of the extended digital video signal, wherein the associated digital video signal is high N bits of the extended digital video signal, and the second ramp voltage is used as the data voltage.

5. The AMOLED display panel according to claim 4, wherein each of the i step adjustment modules comprises a second data strobe circuit and a weighted resistor divider network;

the second data strobe circuit is provided with the first ramp voltage and adapted to be turned on at a second moment to transmit the first ramp voltage of the second moment to a second input terminal of the weighted resistor divider network, and the second moment is a moment associated with a value of the high N bits of the extended digital video signal minus 1; and a first input terminal of the weighted resistor divider network is coupled to an output terminal of the first data strobe circuit, so that the first input terminal of the weighted resistor divider network is provided with the first ramp voltage corresponding to the first moment;

the weighted resistor divider network is adapted to perform, based on the first ramp voltage at the second moment, voltage-division on the preset step according to the voltage-division factor, to obtain the second ramp voltage.

6. The AMOLED display panel according to claim 5, wherein the weighted resistor divider network comprises:

$2^P$ voltage-division resistors sequentially connected end to end, a first terminal of a first voltage-division resistor being coupled to the output terminal of the first data strobe circuit, and a second terminal of a last voltage-division resistor being coupled to an output terminal of the second data strobe circuit;

$2^P$ second switches, a first terminal of a $j^{th}$ second switch being coupled to a second terminal of a $j^{th}$ voltage-division resistor, where $1<j<2^P$, and a second terminal of a $k^{th}$ second switch being coupled to a second terminal of a (k+1)th second switch, where k is an odd number, and $1<k<2^P-1$; and $2^{P-1}$ third switches, a first terminal of a $m^{th}$ third switch being coupled to a second terminal of a $(2\times m-1)^{th}$ second switch, where $1<m<2^P-1$, and second terminals of the $2^{P-1}$ third switches being coupled to output the second ramp voltage.

7. The AMOLED display panel according to claim 1, wherein

M+P=N;

P is a positive integer;

the associated digital video signal is high M bits of the digital video signal; and the source driving circuit further comprises:

i step adjustment modules adapted to perform an amplitude adjustment on the first ramp voltage to obtain a corresponding second ramp voltage such that an amplitude of the second ramp voltage is equal to a value obtained by the first ramp voltage minus the preset step plus a product of the preset step and a voltage-division factor, where the voltage-division factor is one of $2^P$ sub-voltage-division factors, and the $2^P$ sub-voltage-division factors are in an arithmetic progression with a first term of 0 and a tolerance of $1/2^P$; and a control signal generation module adapted to control a magnitude of the voltage-division factor in the respective step adjustment module according to low P bits of the digital video signal, wherein the second ramp voltage is used as the data voltage.

8. The AMOLED display panel according to claim 7, wherein each of the i step adjustment modules comprises a second data strobe circuit and a weighted resistor divider network;

the second data strobe circuit is provided with the first ramp voltage and is adapted to be turned on at a second moment to transmit the first ramp voltage of the second moment to a second input terminal of the weighted resistor divider network, and the second moment is a moment associated with a value of the high M bits of the digital video signal minus 1;

a first input terminal of the weighted resistor divider network is coupled to an output terminal of the first data strobe circuit, so that the first input terminal of the weighted resistor divider network is provided with the first ramp voltage corresponding to the first moment; and the weighted resistor divider network is adapted to perform, based on the first ramp voltage at the second moment, voltage-division on the preset step according to the voltage-division factor to obtain the second ramp voltage.

9. The AMOLED display panel according to claim 7, wherein the source driving circuit further comprises a numerical value extraction module adapted to extract values of the high M bits and the low P bits of the respective digital video signal.

10. An image display device, comprising the AMOLED display panel according to claim 1 and the panel control circuit external to the chip substrate.

* * * * *